US010622812B2

(12) United States Patent
Park et al.

(10) Patent No.: US 10,622,812 B2
(45) Date of Patent: Apr. 14, 2020

(54) POWER CONTROL METHOD FOR MINIMUM POWER POINT TRACKING CONTROL AND APPARATUS THEREFOR

(71) Applicant: SOONGSIL UNIVERSITY RESEARCH CONSORTIUM TECHNO-PARK, Seoul (KR)

(72) Inventors: Joung Hu Park, Seoul (KR); Young Tae Jeon, Siheung-si (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 447 days.

(21) Appl. No.: 15/522,777

(22) PCT Filed: Nov. 13, 2015

(86) PCT No.: PCT/KR2015/012242
§ 371 (c)(1),
(2) Date: Apr. 28, 2017

(87) PCT Pub. No.: WO2016/099034
PCT Pub. Date: Jun. 23, 2016

(65) Prior Publication Data
US 2017/0346289 A1 Nov. 30, 2017

(30) Foreign Application Priority Data
Dec. 19, 2014 (KR) .......................... 10-2014-0184679

(51) Int. Cl.
H02J 3/38 (2006.01)
G05F 1/67 (2006.01)
H02S 50/00 (2014.01)

(52) U.S. Cl.
CPC .............. *H02J 3/383* (2013.01); *G05F 1/67* (2013.01); *H02J 3/385* (2013.01); *H02J 3/38* (2013.01);
(Continued)

(58) Field of Classification Search
CPC .................. H02J 3/383–385; Y02E 10/56–58
See application file for complete search history.

(56) References Cited

U.S. PATENT DOCUMENTS

2011/0031816 A1* 2/2011 Buthker ............ H01L 31/02021
307/82
2012/0091800 A1* 4/2012 Shenoy ............. H01L 31/02021
307/24
(Continued)

FOREIGN PATENT DOCUMENTS

JP 2013-152675 A 8/2013
KR 10-2013-0079846 A 7/2013
(Continued)

OTHER PUBLICATIONS

P.S. Shenoy, K.A. Kim, P.T. Krein, Comparative analysis of differential power conversion architectures and controls for solar photovoltaics, Jul. 30, 2012, IEEE, 2012 IEEE 13th workshop on control and modeling for power electronics (COMPEL). (Year: 2012).*
(Continued)

Primary Examiner — Carlos Amaya
Assistant Examiner — David A Shiao
(74) Attorney, Agent, or Firm — Revolution IP, PLLC

(57) ABSTRACT

A power control method for controlling power of a plurality of power conversion modules that are respectively connected in parallel to a plurality of photovoltaic, includes: sensing a string current value flowing between outermost opposite ends of the plurality of photovoltaic modules, and voltage and current values of each of the photovoltaic (Continued)

modules; changing the string current value and respectively calculating conversion power values of the plurality of power conversion modules per the changed string current value by using the voltage and current values; searching a string current value for a minimum power point tracking control among the changed string current values by using the conversion power values; and controlling the plurality of power conversion modules to track the searched string current value.

4 Claims, 6 Drawing Sheets

(52) U.S. Cl.
CPC .............. *H02S 50/00* (2013.01); *Y02E 10/56* (2013.01); *Y02E 10/563* (2013.01); *Y02E 10/58* (2013.01)

(56) References Cited

U.S. PATENT DOCUMENTS

| | | | |
|---|---|---|---|
| 2014/0067298 A1* | 3/2014 | Shenoy | H02S 50/10 |
| | | | 702/64 |
| 2014/0265589 A1* | 9/2014 | Dally | H02J 3/383 |
| | | | 307/63 |
| 2015/0364918 A1* | 12/2015 | Singh | H01L 31/02021 |
| | | | 307/78 |
| 2016/0294189 A1* | 10/2016 | Uno | G05F 1/67 |
| 2016/0380434 A1* | 12/2016 | Chapman | H02J 3/383 |
| | | | 307/52 |

FOREIGN PATENT DOCUMENTS

| | | |
|---|---|---|
| KR | 10-2013-0130428 A | 12/2013 |
| KR | 10-1370856 B1 | 3/2014 |
| KR | 10-2014-0093355 A | 7/2014 |

OTHER PUBLICATIONS

International Search Report for PCT/KR2015/012242 dated Feb. 26, 2016 from Korean Intellectual Property Office.

\* cited by examiner

—Prior Art—

—Prior Art—

【Figure 3】
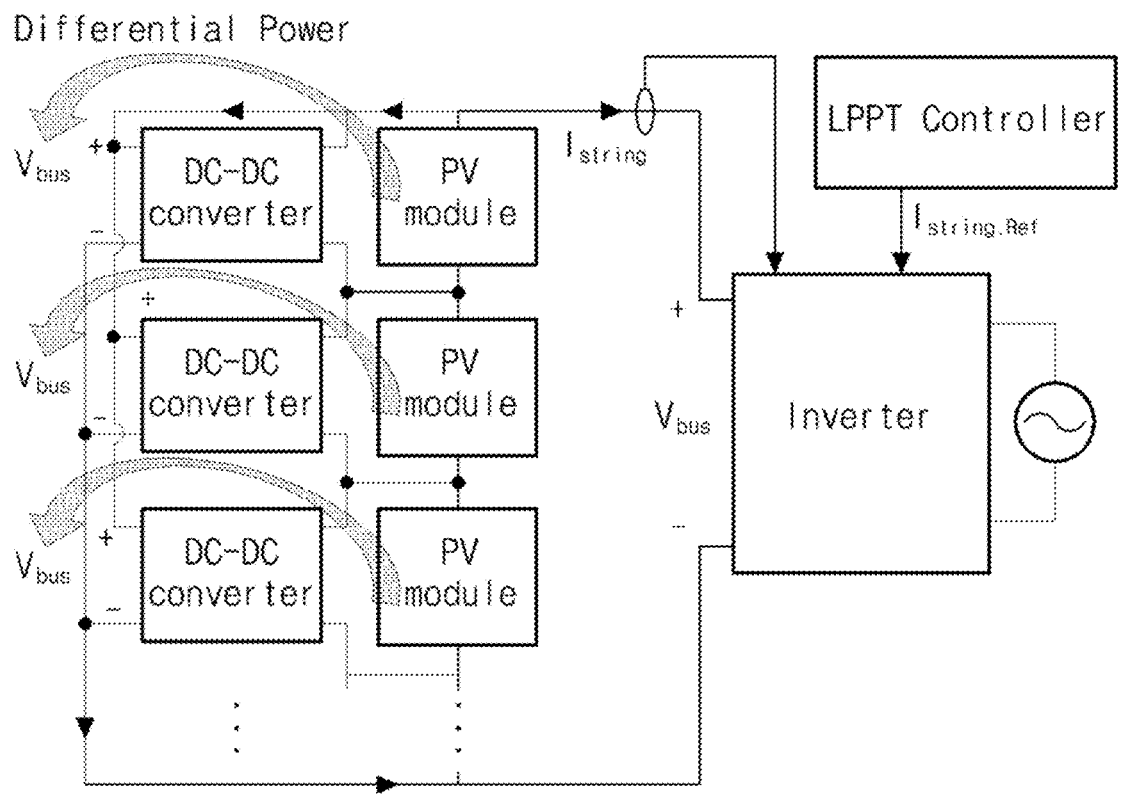
【Figure 4】
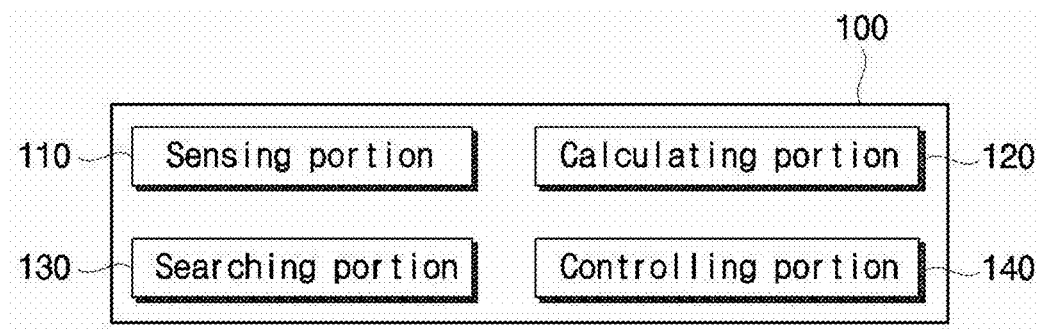

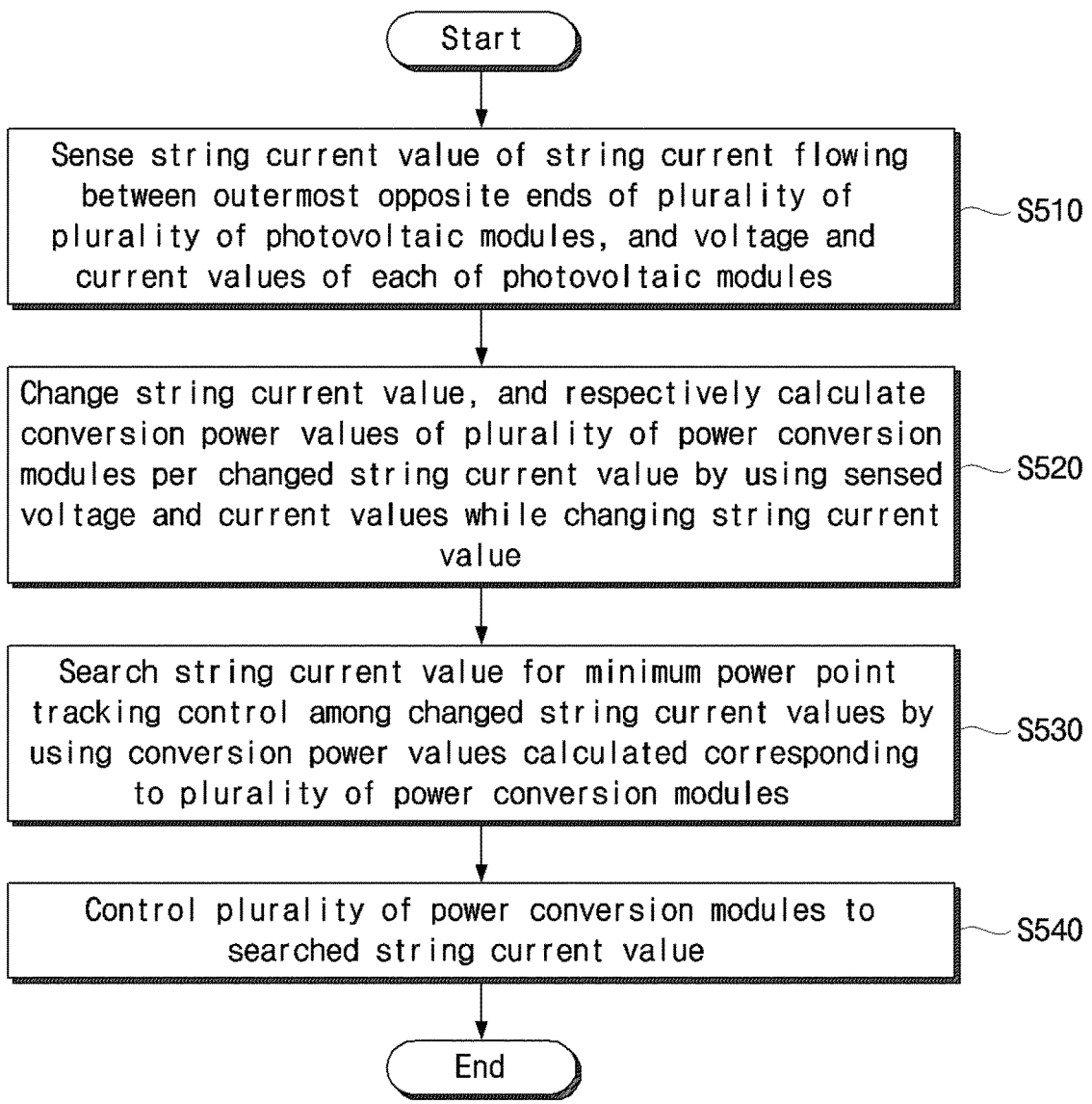

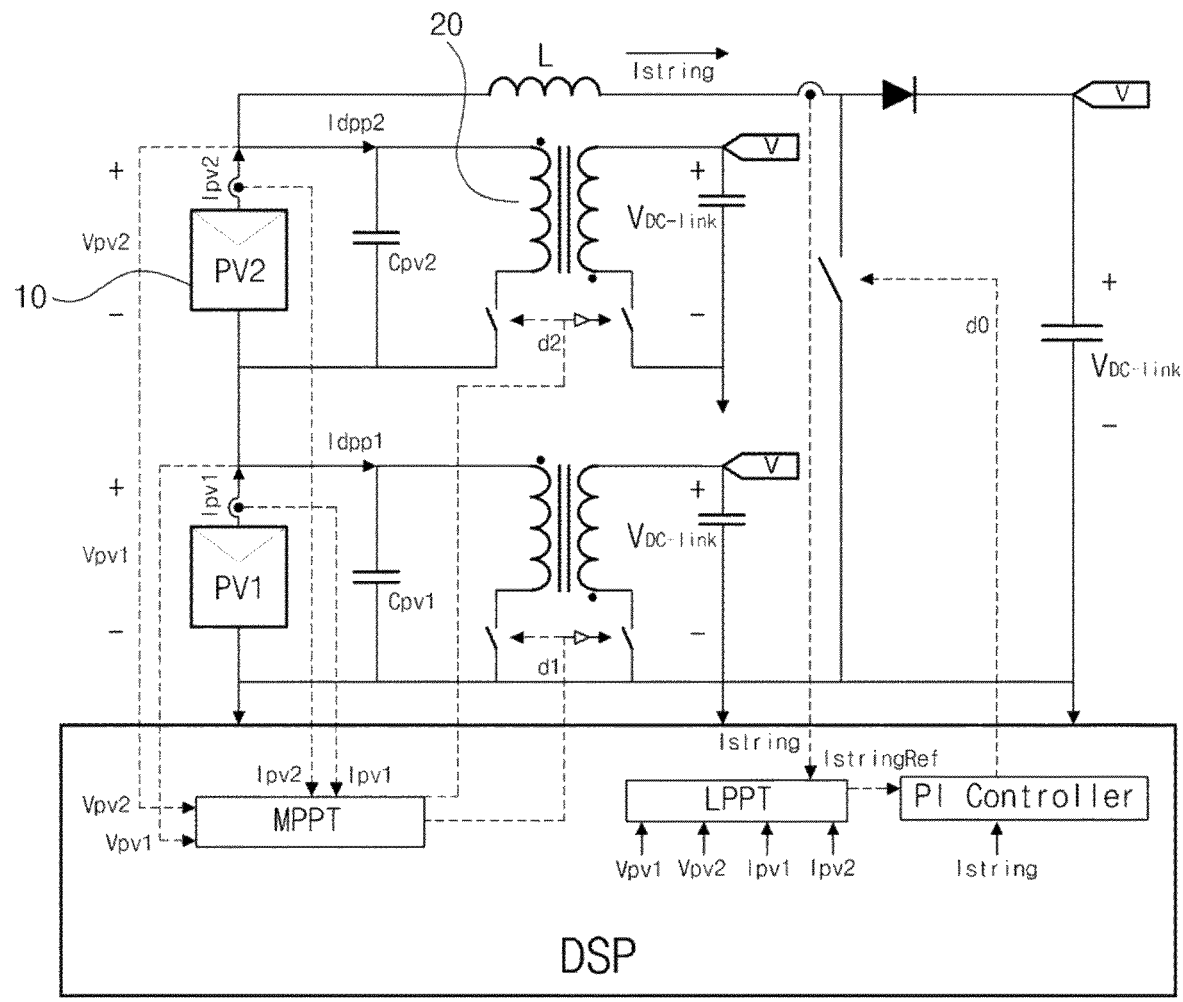
【Figure 6】

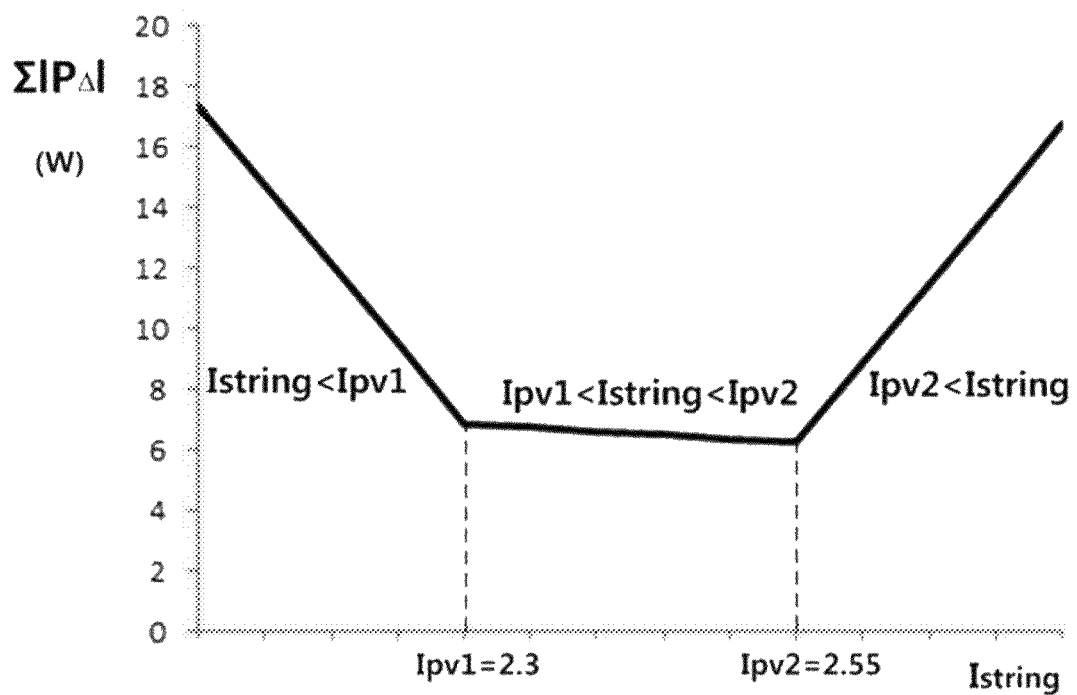
[Figure 7]

【Figure 8】
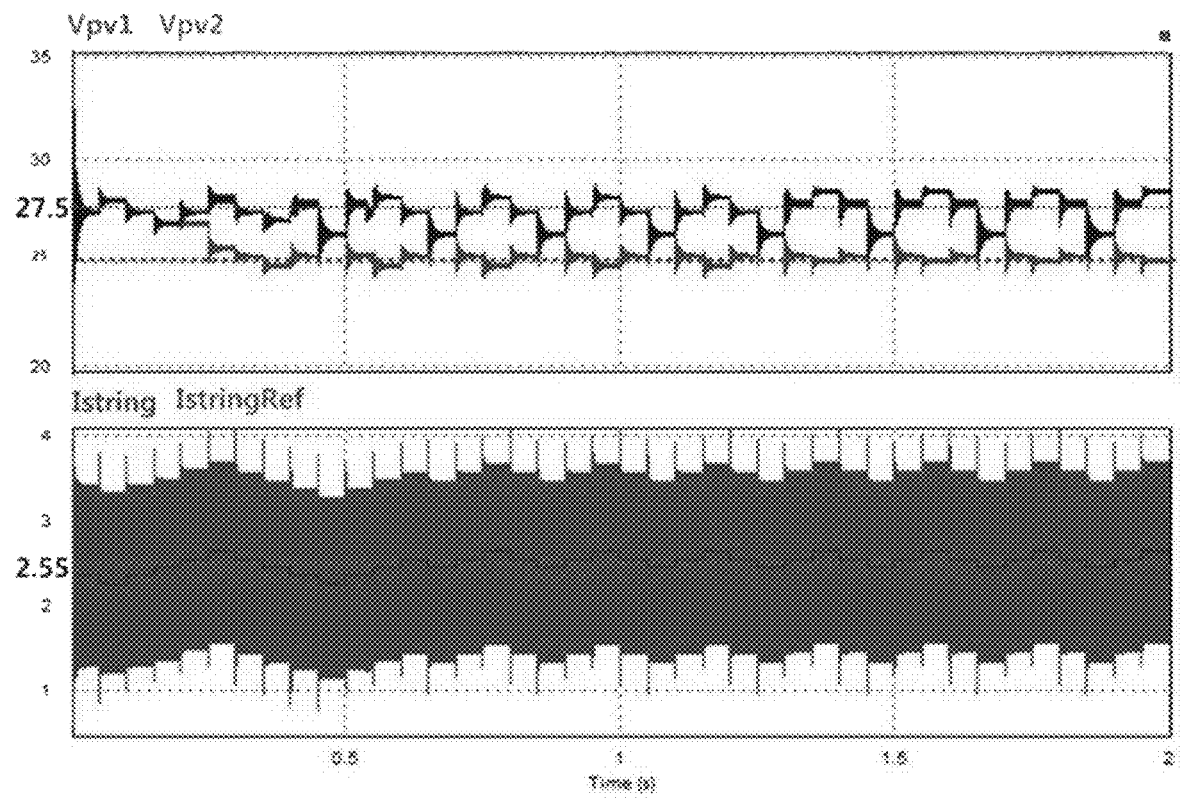
【Figure 9】
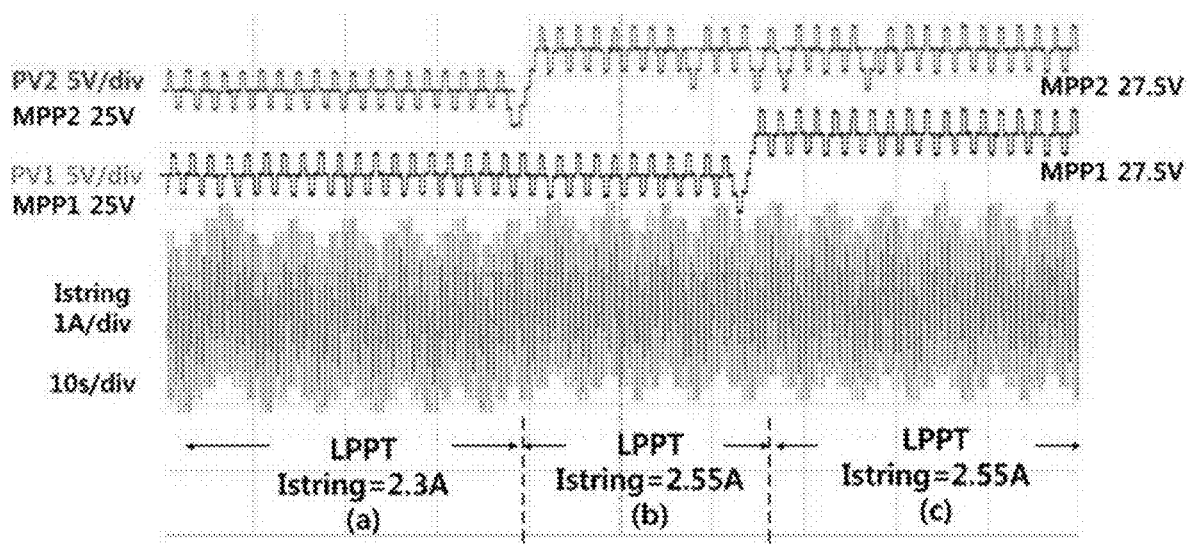

US 10,622,812 B2

POWER CONTROL METHOD FOR MINIMUM POWER POINT TRACKING CONTROL AND APPARATUS THEREFOR

CROSS REFERENCE TO PRIOR APPLICATIONS

This application is a National Stage Application of PCT International Patent Application No. PCT/KR2015/012242 filed on Nov. 13, 2015, under 35 U.S.C. § 371, which claims priority to Korean Patent Application No. 10-2014-0184679 filed on Dec. 19, 2014, which are all hereby incorporated by reference in their entirety.

TECHNICAL FIELD

Background Art

(a) Field of the Invention

The present invention relates to a power control method for minimum power point tracking control and an apparatus therefor, and more particularly, to a power control method for minimum power point tracking control and an apparatus therefor that may minimize an power amount processed by a plurality of power conversion devices respectively connected in parallel to a plurality of photovoltaic modules.

(b) Description of the Related Art

A photovoltaic energy field, which is attracting attention as one of environmentally-friendly green energy fields, is expanding from a conventional power business type to a residential industrial type. Thus, research on a photovoltaic power processing converter has been changed. A centralized system that may be called a first generation photovoltaic power processing converter, a second generation multistring system, and a micro-inverter systems and a modular converter system with improved performance that may be called a third generation or 3.5 generation, have been studied.

FIG. 1 illustrates a schematic view of a photovoltaic power processing converter having a modular converter structure. A 3.5 generation photovoltaic power processing converter is configured to have a structure in which power conversion modules, that is, converters (DC-DC converters) are respectively connected in parallel to photovoltaic modules (PV modules) and outputs of respective converters are connected in series. A reason why the outputs are connected in series is that an input voltage of an inverter is very high above a system voltage.

However, a problem of the structure shown in FIG. 1 is that, when any one photovoltaic module fails (is opened), all of the outputs of the series-connected converters stop and operation of the inverter also stops. Accordingly, the structure shown in FIG. 1 is disadvantageous in that reliability is lowered as the number of modules increases.

Recently, a differential power processing converter, which is attracting attention as a next generation photovoltaic power converter, is a converter that deals only with a power deviation of each photovoltaic module. All the differential power processing converters basically perform power conversion by a power difference of the photovoltaic module.

Accordingly, when the differential power processing converter is used, loss of the power conversion may be reduced, and it is possible to select high-efficiency and low-cost component parts thereof having a low rating when the component parts are selected. In addition, since the differential power processing converter does not operate when a differential power (power difference between the modules) does not occur, it is possible to reduce an operating time FIG. 2 illustrates a schematic view of a typically photovoltaic differential power processing converter. Generally, a DC-DC converter is used as the differential power processing converter. Respective converters are connected in parallel to corresponding photovoltaic modules (PV modules), and respective photovoltaic modules are connected in series to apply string current ($I_{string}$) to an inverter. As such, respective power sources of the photovoltaic modules are connected in series, and the converter is connected in parallel to the power source.

Total power of the power sources is transmitted to the inverter by the string current ($I_{string}$). Herein, a power difference between the power sources is directly transmitted to the inverter through the converter without using the string current ($I_{string}$). As described above, the converter of FIG. 2 is called a differential power processing converter because it processes only the power difference between the photovoltaic modules, not the total power thereof.

However, when the string current ($I_{string}$) extremely increases, the power to be processed by the converter may be very large. In addition, when an arbitrary string current ($I_{string}$) is properly set, the output of the converter may be greatly fluctuated by the photovoltaic power variously outputted in real time.

The background of the present invention is disclosed in Korean Patent Publication No. 1370856 (published on Mar. 3, 2014).

DISCLOSURE

Technical Problem

The present invention has been made in an effort to provide a power control method for minimum power point tracking control and an apparatus therefor that, by minimizing power processed by a plurality of power conversion modules that are respectively connected in parallel to photovoltaic modules in a photovoltaic power generation system, may minimize power loss of the power conversion module.

Technical Solution

An exemplary embodiment of the present invention provides a power control method of a power control apparatus for controlling power of a plurality of power conversion modules that are respectively connected in parallel to a plurality of photovoltaic modules having a series structure, including: sensing a string current value flowing between outermost opposite ends of the plurality of photovoltaic modules, and voltage and current values of each of the photovoltaic modules; changing the string current value and respectively calculating conversion power values of the plurality of power conversion modules per the changed string current value by using the voltage and current values while changing the string current value; searching a string current value for a minimum power point tracking control among the changed string current values by using the conversion power values calculated corresponding to the plurality of power conversion modules; and controlling the plurality of power conversion modules to track the searched string current value.

The searching of the string current value may include searching a string current value that minimizes a sum of absolute values of the conversion power values calculated corresponding to the plurality of power conversion modules.

The sum of the absolute values of the conversion power values calculated corresponding to the plurality of power conversion modules may be defined by an equation below.

$$\sum_{i=1}^{N} |P_\Delta| = \sum_{i=1}^{N} V_{pvi} |I_{pvi} - I_{string}|$$

Herein, N is a number of the photovoltaic modules, $V_{pvi}$ and $I_{pvi}$ are a voltage value and a current value that are sensed in an i-th photovoltaic module, and $I_{string}$ is a string current value.

The searching of the string current value may include deriving a maximum absolute value among each of the conversion power values respectively calculated corresponding to each of the plurality of power conversion modules with respect to the string current values, and searching a string current value corresponding to a minimum value of the conversion power values having the derived maximum absolute value.

The searching of the string current value may include selecting a string current value corresponding to a minimum string current value when there are a plurality of the searched string current values.

Another embodiment of the present invention provides a power control apparatus for controlling power of a plurality of power conversion modules that are respectively connected in parallel to a plurality of photovoltaic modules having a series structure, including: a sensing portion configured to sense a string current value flowing between outermost opposite ends of the plurality of photovoltaic modules and voltage and current values of each of the photovoltaic modules; a calculating portion configured to change the string current value and to respectively calculate conversion power values of the plurality of power conversion modules per the changed string current value by using the voltage and current values while changing the string current value; a searching portion configured to search a string current value for a minimum power point tracking control among the changed string current values by using the conversion power values calculated corresponding to the plurality of power conversion modules; and a controlling portion configured to control the plurality of power conversion modules to track the searched string current value.

Advantageous Effects

According to the power control method for the minimum power point tracking control and the apparatus therefor of the present invention, by minimizing the power processed by the plurality of power conversion modules that are respectively connected in parallel to the photovoltaic modules in the photovoltaic power generation system, it is possible to minimize power loss of the power conversion module and to reduce a size and cost of the converter.

DESCRIPTION OF THE DRAWINGS

FIG. 3 illustrates a schematic view of a photovoltaic differential power processing converter according to an exemplary embodiment of the present invention.

FIG. 4 illustrates a schematic view of a power control apparatus according to an exemplary embodiment of the present invention.

FIG. 5 illustrates a flowchart a power control method of using the power control apparatus of FIG. 4.

FIG. 6 illustrates a schematic view of a bi-directional differential power processing converter to which a power control apparatus according to an exemplary embodiment of the present invention is applied.

FIG. 7 illustrates a graph of $\Sigma|P_\Delta|$ according to a string current in FIG. 6.

FIG. 8 illustrates PSIM simulation results with respect to the converter of FIG. 6.

FIG. 9 illustrates operational waveforms according to a hardware experiment of the converter of FIG. 6.

MODE FOR INVENTION

Figure 1:
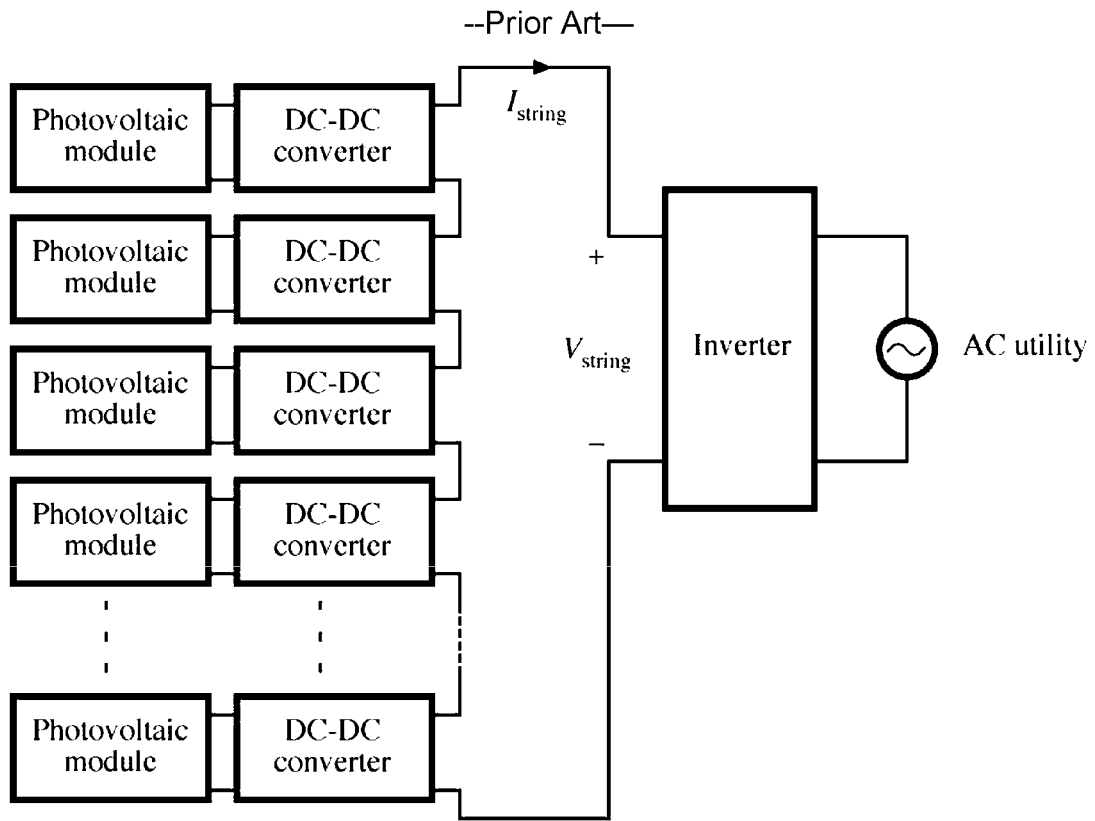
FIG. 1 illustrates a schematic view of a photovoltaic power processing converter having a modular converter structure.
Figure 2:
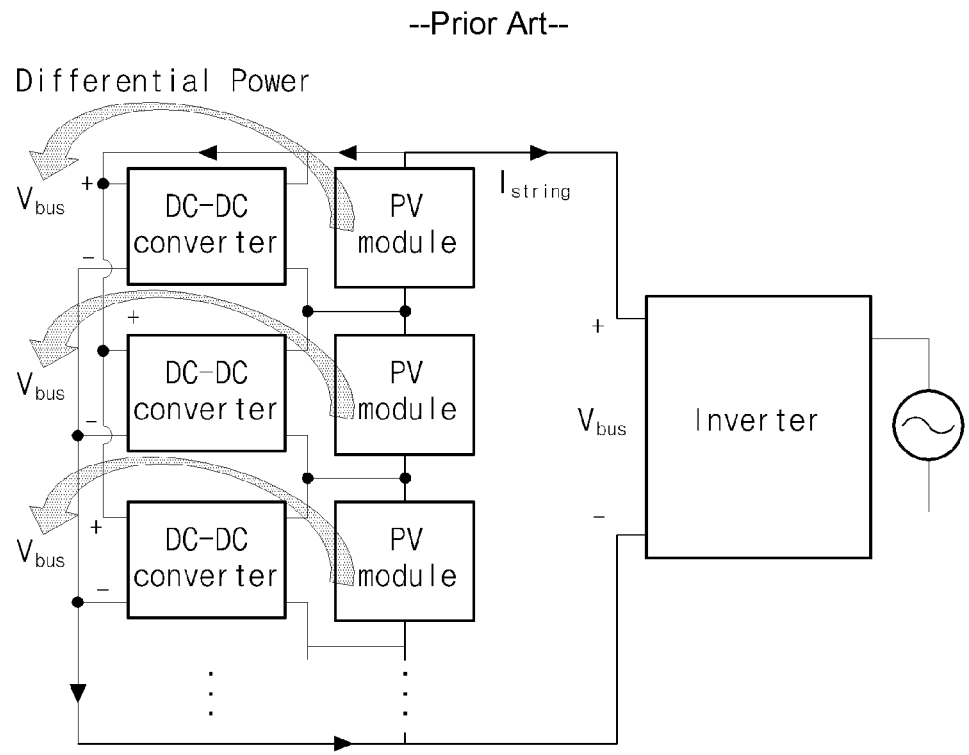
FIG. 2 illustrates a schematic view of a typically photovoltaic differential power processing converter.

The present invention will be described more fully hereinafter with reference to the accompanying drawings, in which exemplary embodiments of the invention are shown.

The present invention relates to a power control method for minimum power point tracking control and an apparatus therefor, and more particularly, to a least power point tracking (LPPT) control method for minimizing power processed by a differential power processing converter of a photovoltaic power generation system.

The present invention may minimize power loss by minimizing power processed by the plurality of power conversion modules (DC-DC converters) respectively connected in parallel to a plurality of photovoltaic modules in the photovoltaic power generation system. In an exemplary embodiment of the present invention described later, a differential power processing converter has the meaning of including a plurality of power conversion modules connected to a plurality of photovoltaic modules.

FIG. 3 illustrates a schematic view of a photovoltaic differential power processing converter according to an exemplary embodiment of the present invention. In FIG. 3, a plurality of photovoltaic modules (PV-modules), a plurality of power conversion modules (DC-DC converters) corresponding to the photovoltaic modules, and an inverter are shown.

FIG. 3 shows an LPPT controlling portion (LPPP controller), which corresponds to a power control apparatus according to an exemplary embodiment of the present invention. In the exemplary embodiment of the present invention, power processed by each power conversion module may be minimized by using the LPPT controlling portion, thereby minimizing a size and cost of each of the power conversion modules.

In FIG. 3, the power conversion modules (DC-DC converters) are respectively connected in parallel to the photovoltaic modules (PV-modules), and the photovoltaic modules (PV-modules) are connected in series such that a string current ($I_{string}$) flows to the inverter.

Herein, the power conversion module (DC-DC converter) corresponds to a converter, that is, a differential power processing converter, which processes only a power deviation of the photovoltaic module (PV-module). The power conversion module (DC-DC converter) does not operate when differential power (a power difference between the modules) does not occur.

According to the configuration described above, total power of respective power sources of the photovoltaic modules (PV-modules) is transmitted to the inverter through the string current ($I_{string}$), while the power difference between the photovoltaic module (PV-module) is directly transmitted to the inverter through the power conversion module (DC-DC converter).

When sunlight shines on all the photovoltaic modules without shade, there is no power difference between the photovoltaic modules, while when sunlight shines on some of the photovoltaic modules with shade, there is a power difference between the photovoltaic modules. Generally, as the power difference increases, power to be converted by the power conversion module increases, thus efficiency loss due to the power conversion occurs.

According to an exemplary embodiment of the present invention that will now be described, when operation of the power conversion module is required due to the power difference between the photovoltaic modules caused by the sunlight with the shade, by minimizing the power of the power conversion module by controlling the string current, a minimum power point tracking method that may reduce power conversion loss may be performed.

FIG. 4 illustrates a schematic view of a power control apparatus according to an exemplary embodiment of the present invention, and FIG. 5 illustrates a flowchart a power control method of using the power control apparatus of FIG. 4. A power control apparatus 100 according to an exemplary embodiment of the present invention includes a sensing portion 110, a calculating portion 120, a searching portion 130, and a controlling portion 140.

First, the sensing portion 110 senses a value of a string current flowing between outermost opposite ends of the plurality of photovoltaic modules, and voltage and current values of each of the photovoltaic modules (S510).

The calculating portion 120 changes (increases or decreases) the string current value, and respectively calculates conversion power values of the plurality of power conversion modules per the changed string current value by using the voltage and current values while changing (increasing or decreasing) the string current value (S520).

The searching portion 130 searches a string current value for a minimum power point tracking control among the changed string current values by using the conversion power values calculated corresponding to the plurality of power conversion modules (S530).

The controlling portion 140 controls the plurality of power conversion modules in order to track the searched string current value by controlling a string converter (a boost converter using L and d0 of FIG. 6) or an inverter (the inverter of FIG. 3) (S540). Accordingly, the power conversion modules respectively operate according to the differential power between the photovoltaic modules, and then the power conversion loss thereof may be minimized.

Hereinafter, a power control method using the power control apparatus will be described in detail. FIG. 6 illustrates a schematic view of a bi-directional differential power processing converter to which a power control apparatus according to an exemplary embodiment of the present invention is applied.

In FIG. 6, for the better understanding and ease of description, two photovoltaic modules PV1 and PV2 and two power conversion modules corresponding to the two photovoltaic modules PV1 and PV2 are shown. In FIG. 6, the differential power processing converter, that is, the power conversion module 20 uses a bidirectional flyback converter because it requires bidirectional power transmission. A direction of the power processed by the bi-directional flyback converter may be one from the photovoltaic module (PV) to the DC-link or one from the DC-link to the photovoltaic module (PV) according to $I_{string}$ corresponding to a current of an inductor of the boost converter, that is, the direction of the power processed by the bi-directional flyback converter may be bidirectional.

In FIG. 6, for the better understanding and ease of description, an inverter is omitted. The power conversion module is connected in parallel to a rear end of the photovoltaic module in FIG. 3 and it is connected in parallel to a front end thereof in FIG. 6, but these are only a positional difference shown in the drawings, and their actual connection relationships are the same.

In FIG. 6, the power conversion module 20 receives the power source of the photovoltaic module 10, and an output of the power conversion module 20 is connected in parallel to the DC-link. The connection structure of the photovoltaic module 10 and the power conversion module 20 is the same as the configuration of the bi-directional differential power processing converter.

The power conversion module 20 may perform an MPPT control function. In this case, the power conversion module 20 may operate the photovoltaic module 10 connected thereto at the maximum power point. The MPPT control method of the photovoltaic module is well known.

If there is no power difference between the photovoltaic modules 10, the total power of the photovoltaic modules 10 is transmitted to DC-link through the booster converter. In this case, the power conversion module 20 (flyback converter) corresponding to the differential power processing converter does not operate.

Herein, power $P_{pvn}$ of an n-th photovoltaic module 10 is defined by the product of $V_{pvn}$ and $I_{pvn}$. If a power difference between two photovoltaic modules 10 occurs due to sunlight with a partial shade ($P_{pv1}-P_{pv2} \neq 0$), the power conversion module 20 processes the power difference.

In this case, power of an n-th power conversion module 20 may be represented as $P_{dppn}$ that is the product of $V_{pvn}$ and $I_{ddpn}$. If a power difference between two photovoltaic modules 10 does not occur ($P_{pv1}=P_{pv2}$), since the power conversion module 20 does not operate, the power of the n-th power conversion module 20 becomes 0 ($P_{dppn}=0$).

In FIG. 6, the string current may be defined by $I_{string}=I_{pvn}-I_{ddpn}$. Here, it can be seen that, when $I_{string}$ is equal to $I_{pvn}$, $I_{ddpn}$ becomes 0 ($I_{ddpn}=0$).

In the exemplary embodiment of the present invention, as one method of minimizing an amount of the power of the power conversion module, a method of searching one $I_{string}$ value that minimizes a sum of absolute values of the conversion power values of respective power conversion modules 20 while gradually increasing or decreasing a sensed $I_{string}$ value, is used.

Here, the sum of the absolute values of the respective conversion power values, that is, $\Sigma|P_\Delta|$ is defined by Equation 1 below.

$$\sum_{i=1}^{N}|P_\Delta| = \sum_{i=1}^{N} V_{pvi}|I_{pvi} - I_{string}| \qquad \text{(Equation 1)}$$

In Equation 1, N is the number of the photovoltaic modules (e.g., N=2 in the case of FIG. 6. $V_{pvi}$ and $I_{pvi}$ are a voltage value and a current value that are sensed in an i-th photovoltaic module 10, and $I_{string}$ is a string current value.

That is, in the exemplary embodiment of the present invention, the calculating portion 120, while changing $I_{string}$ in Equation 1, calculates power values to be converted by the plurality of power conversion modules 20 for each changed string current value using the voltage and current values ($V_{pvi}$ and $I_{pvi}$).

For example, it is assumed that $V_{pv1}$=25V, $I_{pv1}$=2.3 A, $V_{pv2}$=27.5V, $I_{pv2}$=2.55 A, and $I_{string}$=2.3 A that are currently sensed in the sensing portion 110.

When $I_{string}$=2.3 A, the conversion power value of the first power conversion module $P_{A1}=V_{pv1} \times (I_{pv1}-I_{string})$=25×(2.3−2.3)=0 W, and the conversion power value of the second power conversion module $P_{A2}=V_{pv2} \times (I_{pv2}-I_{string})$=27.5×(2.55-2.3)=6.875 W.

In the same way, when $I_{string}$=2.4 A, $P_{A1}$=25×(2.3−2.4)=−2.5 W, and $P_{A2}=V_{pv2} \times (I_{pv2}-I_{string})$=27.5×(2.55-2.4)=4.125V. In addition, when $I_{string}$=2.55 A, $P_{A1}$=−6.25 W and $P_{A2}$=0 W, and when $I_{string}$=2.6 A, $P_{A1}$=−7.5 W and $P_{A2}$=−1.375 W.

Herein, when the conversion power value is negative, it means that the photovoltaic module power is insufficient, thus a power conversion for increasing the photovoltaic module power is required, while when the conversion power value is positive, it means that the photovoltaic module power is left, thus a power conversion for decreasing the photovoltaic module power is required. In order to supply such deviation power, the bi-directional power conversion module 20 supplies energy required for the power conversion to the photovoltaic modules regardless of the sign.

Accordingly, the calculating portion 120 calculates the absolute values of the conversion power values, and the search unit 130 searches a string current value for minimizing $\Sigma|P_A|$ that is a sum of the absolute values. In the above-mentioned example, when $I_{string}$=2.3 A, $\Sigma|P_A|$=6.875 W, when $I_{string}$=2.4 A, $\Sigma|P_A|$=6.675 W, when $I_{string}$=2.55 A, $\Sigma|P_A|$=6.25 W, and when $I_{string}$=2.6 A, $\Sigma|P_A|$=8.875 W. These are merely some of the string current values, and the results for string current values around these are shown in FIG. 7 in a graphical form.

FIG. 7 illustrates a graph of $\Sigma|P_A|$ according to string current values in FIG. 6. In a curved line of $\Sigma|P_A|$ according to the string current values, a minimum point is shown. In FIG. 7, a string current value corresponding to a minimum point is searched at 2.55 A.

Accordingly, the controlling portion 140, then, controls each of the power conversion modules 20 to track the searched string current value, that is, to be driven with a power conversion value corresponding to the searched string current value. That is, the first power conversion module 20 corresponding to the first photovoltaic module PV1 performs a power conversion of 6.25 W that corresponds to $P_{A1}$ when $I_{string}$=2.55 A. In this case, the second photovoltaic module PV2 is not driven because $P_{A2}$=0 W when $I_{string}$=2.55 A, since no power conversion is required.

It is exemplarily described that the minimum point is searched while increasing the string current value, but the present invention is not limited thereto. For example, when the currently sensed string current value is greater than 2.55 A, the minimum point may be searched while decreasing the string current value. This is because, when a curve line of $\Sigma|P_A|$ is plotted as shown in FIG. 7, there is the minimum point. Thus, when the sensed string current value is greater than the minimum point, the minimum point may be found by searching in a direction of decreasing the string current value therefrom.

In addition, after $\Sigma|P_A|$ is obtained from the currently sensed string current values, when $\Sigma|P_A|$ of when the current values are increased (or decreased) therefrom is decreased from the existing value, it is possible to continuously increase (or decrease) the string current values. Then, after any point, when $\Sigma|P_A|$ rises again, a string current value immediately before the rise becomes a minimum point.

Hereinafter, two other exemplary embodiments of the present invention will be described. As described above, a method of searching string current values that minimizes a sum of absolute values of power conversion values for respective photovoltaic modules will be described as a first exemplary embodiment.

In addition, a method in which a maximum absolute value is derived among each of the conversion power values calculated corresponding to each of the plurality of power conversion modules with respect to the string current values during searching the string current values and then a string current value corresponding to a minimum value of the conversion power values having the derived maximum absolute value is searched, will be described as a second exemplary embodiment.

For explaining two exemplary embodiments, a case in which three photovoltaic modules are present will be exemplified. In addition, voltage and current values sensed in the photovoltaic modules are shown in the following tables.

Table 1 shows a string voltage value search according to the method of the first exemplary embodiment. This corresponds to the method described above.

TABLE 1

| | Conversion power value ($P_i$) of i-th power conversion module according to change of $I_{string}$ | | | |
|---|---|---|---|---|
| | $I_{string}$ = 1A | $I_{string}$ = 2A | $I_{string}$ = 3A | $I_{string}$ = 4A |
| When $V_{pv1}$ = 10 V, $I_{pv1}$ = 1A at first photovoltaic module, conversion power value $P_{A1}$ of first power conversion module | 0 W | −10 W | −20 W | −30 W |
| When $V_{pv2}$ = 10 V, $I_{pv2}$ = 2A at second photovoltaic module, conversion power value $P_{A2}$ of second power conversion module | 10 W | 0 W | −10 W | −20 W |
| When $V_{pv3}$ = 10 V, $I_{pv3}$ = 4A at third photovoltaic module, conversion power value $P_{A3}$ of third power conversion module | 30 W | 20 W | 10 W | 0 W |
| $\Sigma|P_A|$ = $|P_{A1}|$ + $|P_{A2}|$ + $|P_{A3}|$ | 40 W | 30 W | 40 W | 50 W |

Referring to Table 1, since the minimum $\Sigma|P_A|$ is 30 W when $I_{string}$=2 A, each power conversion module is controlled to perform power conversion corresponding to $I_{string}$=2 A.

Table 2 shows a string voltage value search according to the method of the second exemplary embodiment.

TABLE 2

|  | Conversion power value ($P_i$) of i-th power conversion module according to change of $I_{string}$ | | | |
|---|---|---|---|---|
|  | $I_{string}$ = 1A | $I_{string}$ = 2A | $I_{string}$ = 3A | $I_{string}$ = 4A |
| When $V_{pv1}$ = 10 V, $I_{pv1}$ = 1A at first photovoltaic module, conversion power value $P_{\Delta1}$ of first power conversion module | 0 W | −10 W | −20 W | −30 W |
| When $V_{pv2}$ = 10 V, $I_{pv2}$ = 2A at second photovoltaic module, conversion power value $P_{\Delta2}$ of second power conversion module | 10 W | 0 W | −10 W | −20 W |
| When $V_{pv3}$ = 10 V, $I_{pv3}$ = 4A at third photovoltaic module, conversion power value $P_{\Delta3}$ of third power conversion module | 30 W | 20 W | 10 W | 0 W |
| Maximum value of $|P_{\Delta i}|$ | 30 W | 20 W | 20 W | 30 W |

In the second exemplary embodiment, for each string current value, the maximum absolute value is derived from the three conversion power values calculated corresponding to the three power conversion modules. For each string current value, the maximum absolute value, as in a lower portion of Table 2, when $I_{string}$=1 A, is 30 W, and when $I_{string}$=2 A, it is 20 W, and when $I_{string}$=3 A, it is 20 W, and when $I_{string}$=4 A, it is 30 W.

Then, a string current value corresponding to a minimum value of the conversion power values having the derived maximum absolute value, is searched. That is, in Table 2, string current values ($I_{string}$=2 A and 3 A) corresponding to a string current value (that is, 20 W) corresponding to a minimum value of 30 W, 20 W, 20 W, and 30 W that are the maximum absolute values derived from respective string current values, is selected.

In this case, since there are a plurality of searched string current values, a string current value corresponding to a minimum string current value may be selected. In addition, it is possible to select a larger string current value as another exemplary embodiment.

Hereinafter, when the structure of the exemplary embodiment of FIG. 6 is used, simulation results will be described. The simulation is performed by the method of the first exemplary embodiment. In the simulation, it is assumed that each of two photovoltaic modules PV1 and PV2 has a maximum power 70 W at Ipv=2.55 A when Vpv=27.5V.

In addition, as shown in FIG. 6, for a maximum power point tracking (MPPT) of the photovoltaic module, a voltage and a current of each photovoltaic module are sensed, duty ratios d1 and d2 are controlled by a direct duty method using a P&O algorithm, and the MPPT is performed by a flyback converter (power conversion module).

Further, the power sum of the differential power processing converter of Equation 1 is calculated by using the sensed string current value of the boost converter and the sensed voltage and current values of each photovoltaic module. Since there is only one minimum power point in the sum of the minimum power of the power conversion module according to the string current value, the minimum power point may be tracked by using the P & O algorithm.

The searched IstringRef (the string current at the minimum power point) becomes the reference current of the PI controller, so that the string current may be controlled. In addition, since the differential power conversion module performs the LPPT operation in which the sum of the power is minimized by the calculated string current, most of the power is transmitted to the DC-link terminal through the boost converter, and the power conversion module (flyback converter) performs the LPPT operation in which the minimum power is transmitted.

FIG. 8 illustrates PSIM simulation results with respect to the converter of FIG. 6. Referring to an upper side drawing of FIG. 8, PV1 performs MPPT at a maximum power point of 25V due to shading, and PV2 performs MPPT at a maximum power point of 27.5V. If there is no shading, PV1 may perform MPPT at the maximum power point of 27.5V like PV2. When operating as in the upper side drawing, since the string current, which minimizes $\Sigma|P_{\Delta}|$, is 2.55 A, referring to a lower side drawing of FIG. 8, it can be seen that the LPPT operation is performed by using this current.

FIG. 9 illustrates operational waveforms according to a hardware experiment of the converter of FIG. 6. FIG. 9 illustrates result waveforms obtained by experimenting with 140 W class hardware. In a section (a) of FIG. 9, because of shading, MPPT points of PV1 and PV2 are Vpv1,2=25 V and Ipv1,2=2.3 A (58.2 W). Since Ipv1=Ipv2, LPPT is performed with Istring=2.3 A.

In a section (b) of FIG. 9, a MPPT point of PV2 is changed to Vpv1=27.5V and Ipv1=2.55 A (70 W) as the maximum solar irradiance is reached. Accordingly, $\Sigma|P_{\Delta}|$ is minimized by tracking $I_{string}$=2.55 A of the section (b). In a section (c) of FIG. 9, the maximum power point (70 W) of PV1 also increases, since Ipv1 is equal to Ipv2, $I_{string}$ is maintained at 2.55 A and $\Sigma|P_{\Delta}|$ becomes zero ($\Sigma|P_{\Delta}|$=0).

As described above, according to the exemplary embodiment of the present invention, it can be seen that the power conversion module may minimize the power loss due to the minimum power consumption thereof by performing the LPPT through the simulations and the experiments. Resultantly, according to the exemplary embodiment of the present invention, it is possible to improve efficiency more than the conventional power processing converter and to be advantageous in size and price.

As described above, according to the power control method and the apparatus therefor of the exemplary embodiment of the present invention, it is possible to minimize the power loss of the power conversion module and to reduce the size and cost of the converter by minimizing the power processed by the plurality of power conversion modules that are respectively connected in parallel to the photovoltaic modules in the photovoltaic power generation system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A power control method of a power control apparatus for controlling power of a plurality of power conversion modules, each power conversion module having a first end connected in parallel to a respective photovoltaic module of a plurality of photovoltaic modules, the plurality of photovoltaic modules connected together in series, and each power conversion module having a second end connected in parallel to an inverter receiving power from the plurality of photovoltaic modules, comprising:
- sensing a value of a string current flowing between outermost opposite ends of the plurality of photovoltaic modules, and voltage and current values of each of the photovoltaic modules;
- changing the string current value using the inverter to a plurality of string current values, and respectively calculating conversion power values of each of the plurality of power conversion modules at each of the plurality of string current values by using the sensed voltage and current values while at each of the plurality of string current values;
- searching the plurality of string current values and determining which of the plurality of string current values corresponds to a minimum power point by deriving a maximum absolute value among each of the calculated conversion power values for each of the plurality of string current values, and selecting a string current value corresponding to a minimum value of the derived maximum absolute values as the minimum power point; and
- controlling the plurality of power conversion modules to track the minimum power point such that the string current matches the minimum power point.

2. The power control method of claim 1, wherein
determining which of the plurality of string current values corresponds to the minimum power point includes determining whether multiple string current values of the plurality of string current values correspond to the minimum value of the derived maximum absolute values, and selecting the smallest of the multiple string current values.

3. A power control apparatus for controlling power of a plurality of power conversion modules, each power conversion module having a first end connected in parallel to a respective photovoltaic module of a plurality of photovoltaic modules, the plurality of photovoltaic modules connected together in series, and each power conversion module having a second end connected in parallel to an inverter receiving power from the plurality of photovoltaic modules, comprising:
- a sensing portion configured to sense a value of a string current flowing between outermost opposite ends of the plurality of photovoltaic modules and voltage and current values of each of the photovoltaic modules;
- a calculating portion configured to change the string current value using the inverter to a plurality of string current values, and to respectively calculate conversion power values of each of the plurality of power conversion modules at each of the plurality of string current values by using the sensed voltage and current values while at each of the plurality of string current values;
- a searching portion configured to search the plurality of string current values and determining which of the plurality of string current values corresponds to a minimum power point by deriving a maximum absolute value among each of the calculated conversion power values for each of the plurality of string current values, and selecting a string current value corresponding to a minimum value of the derived maximum absolute values as the minimum power point; and
- a controlling portion configured to control the plurality of power conversion modules to track the minimum power point such that the string current matches the minimum power point.

4. The power control apparatus of claim 3, wherein
the searching portion determines whether multiple string current values of the plurality of string current values correspond to the minimum value of the derived maximum absolute values, and selects the smallest of the multiple string current values.

* * * * *